Aug. 7, 1928.
H. J. MURPHY
1,679,537
LUBRICATING APPARATUS
Filed March 14, 1922
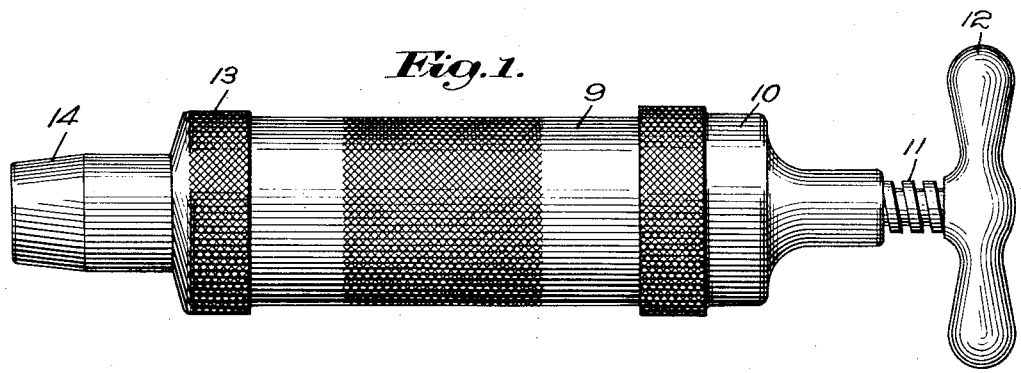
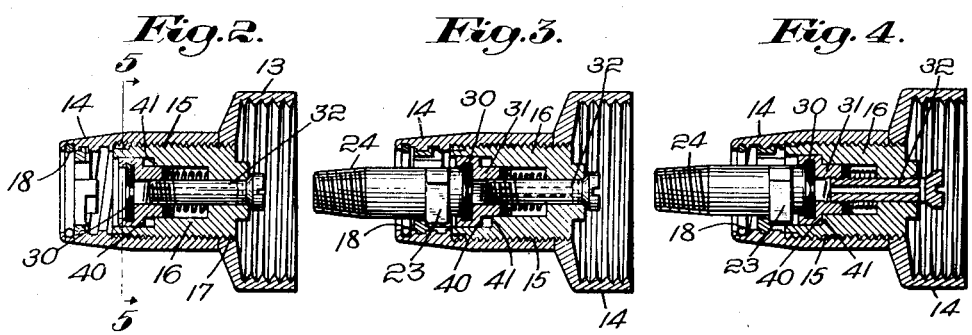
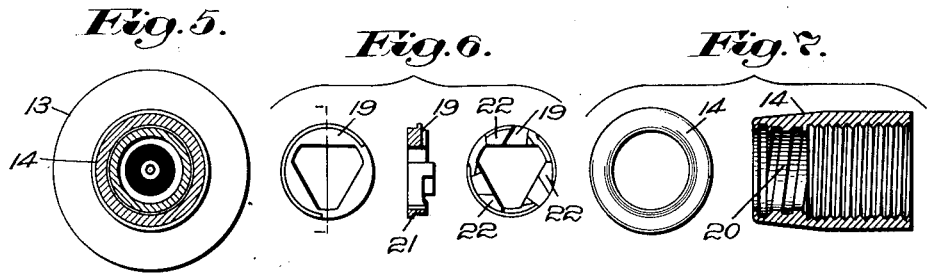
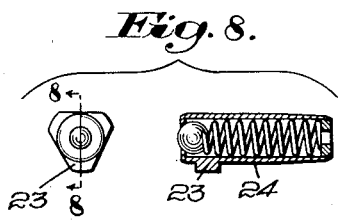
Inventor:
Howard J. Murphy.
By Emery Booth Janney & Varney.
Attys.

Patented Aug. 7, 1928.

1,679,537

UNITED STATES PATENT OFFICE.

HOWARD J. MURPHY, OF READING, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed March 14, 1922. Serial No. 543,653.

This invention pertains to impovements in lubricating apparatus, and more particularly to that class of lubricating apparatus wherein a source of lubricant under pressure is connected to a lubricant-receiving element.

In the drawings, which show a preferred form of one embodiment of my invention:—

Figure 1 is a side elevation of a lubricant gun;

Fig. 2 is a longitudinal, central section through the nozzle of the gun, showing the parts thereof in the relation which they occupy when not connected to the lubricant-receiving element nipple;

Fig. 3 is a view similar to Fig. 2, showing the parts in the same relation as in Fig. 2, but showing the nipple entered within the nozzle;

Fig. 4 is a sectional view similar to Fig. 3, showing the relation of the parts pursuant to coupling and valve opening operations;

Fig. 5 is a section on the line 5—5 of Fig. 2, being partly in elevation;

Fig. 6 shows three views of a preferred form of coupling part, including top and bottom elevations and a central longitudinal section;

Fig. 7 shows an end elevation and central, longitudinal section, respectively, of the preferred form of nozzle; and Fig. 8 shows an end elevation and central longitudinal section, respectively, of a preferred form of lubricant-receiving nipple.

Referring to the drawings and to the preferred form of my invention selected for illustrative purposes, I have shown a lubricant-expelling device including a lubricant gun having a barrel 9, rear head 10, stem 11 threaded therein and handle 12, all of which may be of any ordinary or usual construction. At the discharge end of the lubricant gun, I have shown a front head 13 carrying a nozzle which, in the preferred form of my invention, takes the form of a nozzle sleeve 14 interiorly threaded at 15 to engage a plug 16, which may conveniently be connected to the front head by threads at 17. Adjacent the open end of the nozzle sleeve 14, I have shown an annular spring 18 entered in a groove and adapted to prevent loss of a coupling part 19 (Fig. 6) entered within the nozzle sleeve 14 and engaging the interior thereof by inclined means typified by the threads 20, 21.

The coupling part 19 is provided, preferably as illustrated, at its inner surface with projections 22 against which the lateral faces of suitable projections 23 on the lubricant-receiving nipple 24 may abut when the lubricant-receiving end of said nipple 24 is entered in the nozzle of the lubricating device through the central aperture in the coupling part 19. The coupling part 19 also provides adjacent the projections 22, inner faces adapted to underlie the projections 23 on the lubricant-receiving nipple when the coupling part is turned with the nozzle part 14 relative to said nipple.

The coupling operation, per se, thus includes the entrance of the nipple 24 into the nozzle to the position illustrated in Fig. 3, after which turning of the nozzle part 14 with the lubricant barrel etc. in a clockwise direction will initially turn the coupling part 19 until portions thereof underlie the projections 23 on the nipple 24 and until the projections or bosses 19 abut against the lateral faces of the projections on the nipple. Further turning of the nozzle 14 in a clockwise direction will cause relative movement between the nozzle 14 and the coupling part 19 because of the co-acting operation of the threads 20, 21 on the coupling part and nozzle respectively. This relative movement will result in pressing the coupling part 19 against the under side of the projections 23 on the nipple 24 until the desired seal is effected. In the preferred form of my invention illustrated, a sealing disc 30 is mounted to reciprocate relative to the nozzle 14 and cooperating parts, being carried by the slidable sealing part 31 within the nozzle. A valve controlling discharge of lubricant to the lubricant-receiving part 24 may conveniently be connected to and operated by movement of the sealing part 31, the valve 32 herein illustrated being of the longitudinal movable type, best viewed in Figs. 3 and 4. To limit valve-opening movement and to provide a positive seal independent of the pressure of the lubricant pursuant to the completion of the coupling and valve-opening operations, I may provide opposed shoulders 40, 41 on the sealing part 31 and cooperating nozzle or valve-carrying plug 16, so that, when coupling is effected as shown in Fig. 4, these shoulders will abut and provide a positive support for the sealing washer 30.

The operation of the gun is thus to slip the nozzle over the lubricant-receiving nipple until the shoulders or projections 23 on the nipple have passed through the coupling part 19 and then to turn the nozzle and associated parts in clockwise direction until the sealing disc 30 is pressed against the lubricant-receiving end of the nipple, after which continued turning movement of the nozzle to the right will move the nozzle 14 and nozzle plug 16 forward, leaving the sealing disc 30, sealing part 31 and associated valve 32 stationary so that, as the nozzle or valve-carrying plug 16 moves forward, the valve 32 will be open to permit flow of lubricant therethrough to the lubricant-receiving end of the nipple 24.

During uncoupling by reverse rotation of the barrel, a tight seal will be provided until the valve is closed. During valve opening and closing, the seal is urged toward the nipple by pressure of the lubricant, but, in the preferred form of my invention, a positive backing up of the sealing part is provided when the valve is entirely opened, this by the engagement of cooperating shoulders rearwardly of the sealing part.

While I have shown and described a preferred form of one embodiment of my invention, it will be understood that changes involving omission, substitution, alteration and reversal of parts, and even changes in the mode of operation, may be made without departing from the scope of my invention, which is best defined in the following claim.

I claim:

Lubricant apparatus including a lubricant supply means presenting a nozzle having a part adapted to receive the end of a lubricant receiving member, sealing means carried by said nozzle, an annulus contained in said receiving part of the nozzle and having an aperture therein through which the end of said lubricant receiving member may pass, means projecting from the inner face of said annulus for engaging with projections on said lubricant receiving member, said annulus connected to said nozzle by inclined means whereby, when said nozzle is turned to engage the projections on said lubricant receiving member with the annulus, the annulus being held from rotation relative to the lubricant receiving member rides up such inclined means of the nozzle to advance the nozzle relative to the receiving member and said annulus, and thereby to press the end of the receiving member against said sealing part, and a valve openable by movement of said sealing part relative to said nozzle.

In testimony whereof, I have signed my name to this specification.

HOWARD J. MURPHY.